United States Patent Office 2,802,362
Patented Aug. 13, 1957

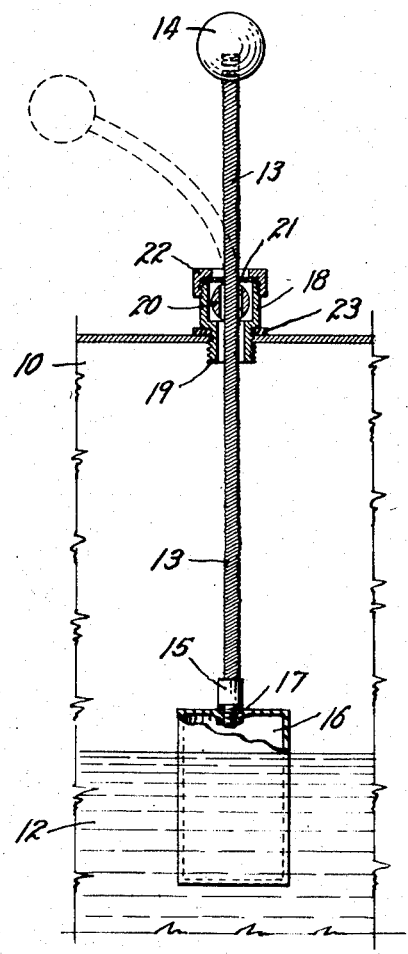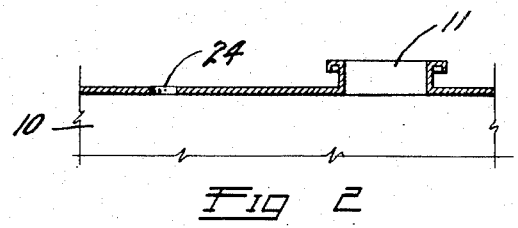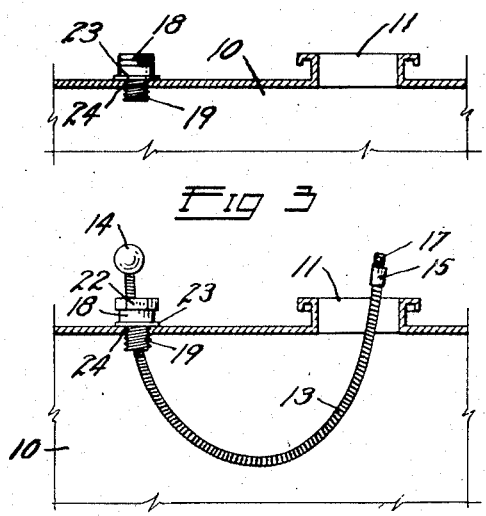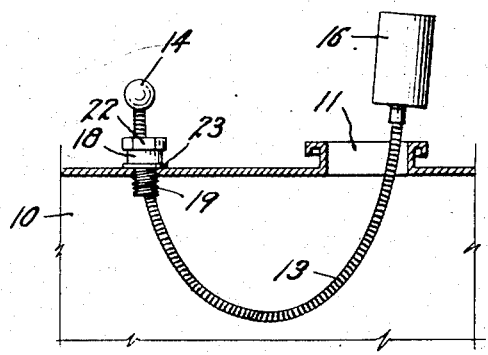

2,802,362

FLUID LEVEL INDICATORS

Newton E. Lyon, Cheyenne Wells, Colo.

Application July 26, 1954, Serial No. 445,506

2 Claims. (Cl. 73—322)

This invention relates to a fluid level indicator, and more particularly to a device for indicating the amount or gasoline or other liquid fuel in the fuel tank of a tractor or similar heavy-duty machine. Ordinary floats and float rods have not been satisfactory for use on heavy-duty machinery, such as farm tractors, road machinery and the like, due to the fact that the rods project upwardly from the fuel tanks and quickly become bent so that they will not indicate properly or become completely broken away.

The principal object of this invention is to provide a fluid level indicator for use on rough heavy-equipment which will have a level-indicating rod which can be freely and easily bent in any direction without damaging the rod or the indicating function thereof.

Another objection to the conventional fluid level indicators on tractors and the like is that when the rods become bent and broken, it is impossible to repair them without dismounting and opening the fuel tanks. Since such a procedure is exceedingly inconvenient and expensive and since it would require stoppage of the equipment at important times repairs are usually neglected and as a result the operators have no indication as to the amount of fuel remaining in the tank. Another object of this invention is to provide a float actuated fluid level indicator for tractor fuel tanks which can be quickly and easily installed in or removed from the present tanks without dismantling or draining the latter.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary section through the upper portion of a conventional fuel tank, illustrating the improved liquid level indicator, partially in section, in place therein; and Figs. 2 through 5, inclusive, are fragmentary sections through the upper portion of a conventional fuel tank, illustrating successive steps employed in installing the improved liquid level indicator in a conventional tank.

In the drawing, the upper portion of a conventional fuel tank is indicated at 10 with its filling nipple at 11 and the liquid fuel therein at 12.

The improved liquid level indicator employs a tubular, flexible float rod or stem 13 formed from spring wire tightly coiled in a helical, cylindrical, hollow coil to form a freely flexible tubular resilient stem. A signal knob 14 is removably mounted on the upper extremity of the stem 13 in any desired manner and a coupling fitting 15 is soldered or otherwise permanently mounted on the lower extremity thereof. The fitting 15 may be of any desired type suitable for attachment to a hollow float 16. As illustrated, it is provided with a threaded stud 17 adapted to be threaded into the top of the float 16.

In the assembled device, the stem 13 extends through a ball cup 18 having a threaded nipple 19 projecting downwardly from its bottom adapted to be threaded into an opening in the top of the fuel tank 10. The ball cup 18 may be sealed to the tank 10 by means of a suitable sealing gasket 23. The threads on the nipple 19 are of a thread-forming type such as used on sheet metal screws.

A bearing ball 20 is positioned in the ball cup 18 and the flexible stem 13 extends through a diametric passage in the ball 20. The stem also passes through a very flexible, relatively thin, stretchable sealing disc 21 which is clamped across the top of the ball cup 18 by means of a threaded cap member 22.

The opening in the cap member 22 is relatively large so as to allow free flexure of the stem and free rotation of the ball 20 when the stem is subjected to an external bending force so as to prevent sharp bends or kinks in the stem. The disc 21 is sufficiently flexible so as not to interfere with radial bending movement of the stem 13.

It is desired to call particular attention to the unique manner of installing the improved float level indicator in the tank 10. This is accomplished by drilling a hole 24, of slightly less diameter than the overall diameter of the nipple 19, in the top of the tank adjacent the filling nipple 11, as shown in Fig. 2.

The threaded nipple 19 on the ball cup 18 is forced into the hole 24 and rotated therein to form threads in the top of the tank so that the ball cup 18 can be screwed tightly against the sealing gasket 23, as shown in Fig. 3.

The flexible stem 13 is now passed downwardly through the ball cup 18 and into the tank. A suitable hooked tool or wire is now inserted through the filling nipple 11 into engagement with the stem and the lower extremity of the latter is pulled upwardly through the filling nipple 11, as shown in Fig. 4.

The hollow float 16 is now threaded onto the stud 17 to secure it fixedly in place on the stem, as shown in Fig. 5. The attached float is now forced downwardly through the filling nipple and into the tank so as to allow the stem to return to its normal vertical position, as shown in Fig. 1, ready for use.

The bearing ball 20, the flexible sealing disc 21 and the cap member 22 may be in position on the stem before its insertion into the ball cup. Or they could be placed therein after insertion by removing the signal knob 14. In any event the ball is placed in the ball cup, the disc is placed thereover and the cap member is screwed in place and the device is ready for use.

Conventional indicating devices have not been satisfactory for the rough treatment to which they are subjected on tractors and the like. The flexible stem or float rod 13 of this device can be accidentally or intentionally bent in any direction, as indicated in broken line in Fig. 1, without damage to the efficient functioning of the indicator.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A fluid level indicating device comprising: a hollow fitting adapted to be mounted through the top of a fuel tank; a hollow, cylindrical, normally straight, helical coil of spring wire forming a freely flexible stem, said stem extending freely downwardly through said fitting into said tank; a float mounted on the lower extremity of said stem within said tank, said stem being sufficiently flexible to allow it to be bent outwardly through a filling opening in said tank so that said float may be attached to the lower extremity of said stem exteriorly of said tank while said stem is in place in said fitting, and said stem being sufficiently resilient to resume its normally straight alignment when released from bending influences; a signal device mounted on the upper extremity of and supported by said stem above said tank; a cap member on the upper extremity of said fitting, there being an opening in said cap for the passage of said stem, said opening being sufficiently larger than said stem to allow the latter to be flexed sidewardly within said fitting; and a flexure ball rotatably mounted in said fitting, said stem passing freely diametrically through said ball, the latter acting to rotate when said stem is flexed to prevent sharp bending or kinking of said stem.

2. A fluid level indicating device as described in claim 1 having a freely flexible and stretchable sealing disc surrounding said stem and clamped in place between said cap member and said fitting and adapted to flex sidewardly to allow free bending flexure of said stem.

References Cited in the file of this patent

UNITED STATES PATENTS

| | | |
|---|---|---|
| 1,225,178 | Rogers | May 8, 1917 |
| 1,509,304 | MacLellan | Sept. 23, 1924 |
| 1,937,447 | Tokheim | Nov. 28, 1933 |
| 2,242,603 | Weldy | May 20, 1941 |